United States Patent
Biel et al.

[11] 3,907,864
[45]* Sept. 23, 1975

[54] AMINO ACID ESTERS AND AMIDES OF DISUBSTITUTED PHENETHYLAMINES

[75] Inventors: John Hans Biel, Lake Bluff Village, Ill.; Irwin L. Klundt, Brookfield, Wis.

[73] Assignee: Abbott Laboratories, North Chicago, Ill.

[ * ] Notice: The portion of the term of this patent subsequent to July 11, 1989, has been disclaimed.

[22] Filed: Feb. 15, 1973

[21] Appl. No.: 332,980

[52] U.S. Cl. . 260/471 C; 260/239 A; 260/268 MK; 260/309; 260/326.14 T; 260/326.47; 260/519; 260/559 A; 260/562 N; 424/250; 424/256; 424/262; 424/300; 424/319; 424/324
[51] Int. Cl.² .................................... C07C 125/06
[58] Field of Search .................... 260/471 C

[56] References Cited
UNITED STATES PATENTS
3,742,022   6/1973   Verbiscar................. 260/471 C

*Primary Examiner*—Anton H. Sutto
*Assistant Examiner*—L. A. Thaxton
*Attorney, Agent, or Firm*—Vincent A. Mallare; Robert L. Niblack

[57] ABSTRACT

Amino acid amides of disubstituted phenethylamines represented by the formula

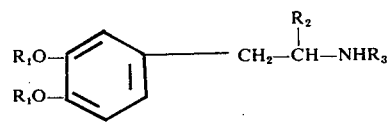

wherein each $R_1$ is hydrogen or benzyl; $R_2$ is hydrogen or loweralkyl and $R_3$ is an amino acid selected from the group consisting of β-alanine, α-methylalanine, phenylalanine, 3,4-dihydroxyphenylalanine, 4-chlorophenylalanine, glycine, tyrosine, valine, leucine, iso-leucine, serine, threonine, cysteine, methionine, tryptophane, aspartic acid, glutamine, arginine, lysine, histidine, γ-aminobutyric acid, pyroglutamic acid, alanine, proline, sarcosine, N-methylpiperazinobutyric acid, or

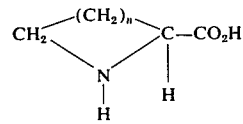

wherein $n$ is an integer from 1 to 4, or $R_3$ is one of the above amino acids protected by either carbobenzyloxy or t-butyloxycarbonyl; and the pharmaceutically acceptable acid addition salts thereof, with the limitation that when $R_2$ is hydrogen and $R_3$ is an amino acid other than

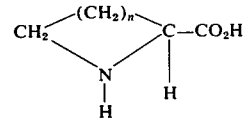

$R_1$ cannot be hydrogen. The amino acid amides of disubstituted phenethylamines of the present invention are useful as renal vasodilators and hypotensive agents.

10 Claims, No Drawings

AMINO ACID ESTERS AND AMIDES OF DISUBSTITUTED PHENETHYLAMINES

DETAILED DESCRIPTION OF THE INVENTION

This invention relates to novel amino acid amides of disubstituted phenethylamines which are useful as renal vasodilators and hypotensive agents and to intermediates useful in their preparation.

The compounds of this invention are represented by the formula

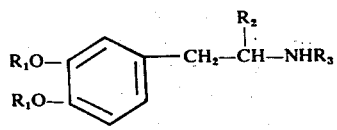

wherein each $R_1$ is hydrogen or benzyl; $R_2$ is hydrogen or loweralkyl and $R_3$ is an amino acid selected from the group consisting of β-alanine, α-methylalanine, phenylalanine, 3,4-dihydroxyphenylalanine, 4-chlorophenylalanine, glycine, tyrosine, valine, leucine, iso-leucine, serine, threonine, cysteine, methionine, tryptophane, aspartic acid, glutamine, arginine, lysine, histidine, γ-aminobutyric acid, pyroglutamic acid, alanine, proline, sarcosine, N-methylpiperazinobutyric acid or

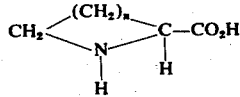

wherein $n$ is an integer from 1 to 4, or $R_3$ is one of the above amino acids protected by either carbobenzyloxy or t-butyloxycarbonyl; and the pharmaceutically acceptable acid addition salts thereof, with the limitation that when $R_2$ is hydrogen and $R_3$ is an amino acid other than

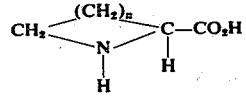

$R_1$ cannot be hydrogen.

The term "loweralkyl" as used herein, refers to both straight and branched chain $C_1$-$C_6$ alkyl groups including methyl, ethyl, n-propyl, iso-propyl, n-butyl, sec-butyl, tert-butyl, iso-butyl, n-pentyl, iso-pentyl, neo-pentyl, n-hexyl and the like.

The term "pharmaceutically acceptable acid addition salts" refers to non-toxic acid addition salts which are generally prepared by reacting the amides of this invention with a suitable organic or inorganic acid. Representative salts include the hydrochloride, hydrobromide, sulfate, bisulfate, acetate, oxalate, valerate, oleate, laurate, borate, benzoate, lactate, phosphate, tosylate, citrate, maleate, fumarate, succinate, tartrate and the like.

When $R_1$ is hydrogen, representative compounds of the present invention include the following:

N-3',4'-Dihydroxy-β-phenethyl-L-3,4-dihydroxyphenylalanine amide
N-3',4'-Dihydroxy-β-phenethyl-L-alanine amide
N-3',4'-Dihydroxy-α-methyl-β-phenethyl-L-alanine amide
N-3',4'-Dihydroxy-β-phenethyl-L-tyrosine amide
N-3',4'-Dihydroxy-α-methyl-β-phenethyl-L-tyrosine amide
N-3',4'-Dihydroxy-β-phenethyl glycine amide
N-3',4'-Dihydroxy-α-methyl-β-phenethyl glycine amide
N-3',4'-Dihydroxy-β-phenethyl-DL-valine amide hydrochloride
N-3',4'-Dihydroxy-α-methyl-β-phenethyl-DL-valine amide hydrochloride
N-3',4'-Dihydroxy-β-phenethyl-D-isoleucine amide oxalate
N-3',4'-Dihydroxy-α-methyl-β-phenethyl-D-isoleucine amide oxalate
N-3',4'-Dihydroxy-β-phenethyl-L-leucine amide tartrate
N-3',4'-Dihydroxy-α-methyl-β-phenethyl-L-leucine amide tartrate
N-3',4'-Dihydroxy-β-phenethyl-L-phenylalanine amide
N-3',4'-Dihydroxy-α-methyl-β-phenethyl-L-phenylalanine amide
N-3',4'-Dihydroxy-β-phenethyl-D-serine amide sulfate
N-3',4'-Dihydroxy-α-methyl-β-phenethyl-D-serine amide sulfate
N-3',4'-Dihydroxy-β-phenethyl-L-threonine amide
N-3',4'-Dihydroxy-α-methyl-β-phenethyl-L-threonine amide
N-3',4'-Dihydroxy-β-phenethyl-L-cysteine amide
N-3',4'-Dihydroxy-α-methyl-β-phenethyl-L-cysteine amide
N-3',4'-Dihydroxy-β-phenethyl-DL-methionine amide
N-3',4'-Dihydroxy-α-methyl-β-phenethyl-DL-methionine amide
N-3',4'-Dihydroxy-β-phenethyl-L-tryptophane amide
N-3',4'-Dihydroxy-α-methyl-β-phenethyl-L-tryptophane amide
N-3',4'-Dihydroxy-β-phenethyl-D-aspartylamide tosylate
N-3',4'-Dihydroxy-α-methyl-β-phenethyl-D-aspartylamide tosylate
N-3',4'-Dihydroxy-β-phenethyl-DL-glutamylamide
N-3',4'-Dihydroxy-α-methyl-β-phenethyl-DL-glutamylamide
N-3',4'-Dihydroxy-β-phenethyl-L-arginine amide
N-3',4'-Dihydroxy-α-methyl-β-phenethyl-L-arginine amide
N-3',4'-Dihydroxy-α-isopropyl-β-phenethyl-DL-arginine amide
N-3',4'-Dihydroxy-β-phenethyl-D-lysine amide
N-3',4'-Dihydroxy-α-methyl-β-phenethyl-D-lysine amide
N-3',4'-Dihydroxy-β-phenethyl-DL-histidine amide
N-3',4'-Dihydroxy-α-methyl-β-phenethyl-DL-histidine amide
N-3',4'-Dihydroxy-β-phenethyl-DL-4-chlorophenylalanine amide
N-3',4'-Dihydroxy-α-methyl-β-phenethyl-DL-4-chlorophenylalanine amide When $R_1$ is benzyl and the amino acid is protected by a carbobenzyloxy group, representative compounds include:

[N'-Carbobenzyloxy-L-alanyl]-N-(3',4'-dibenzyloxy-α-methyl-β-phenethyl)amine
[N'-Carbobenzyloxy-L-alanyl]-N-(3',4'-dibenzyloxy-β-phenethyl)-amine
[N'-Carbobenzyloxy-L-glycyl]-N-(3',4'-dibenzyloxy-β-phenethyl)-amine
[N'-Carbobenzyloxy-L-isoleucyl]-N-(3',4'-dibenzyloxy-β-phenethyl)-amine
[N'-Carbobenzyloxy-L-phenylalanyl]-N-(3',4'-dibenzyloxy-β-phenethyl)amine
[N'-Carbobenzyloxy-L-glutamyl]-N-(3',4'-dibenzyloxy-β-phenethyl)-amine, and the like Compounds wherein $R_1$ is benzyloxy and $R_3$ is either an amino acid or a carbobenzyloxy-protected amino acid are useful as intermediates in the synthesis of compounds wherein $R_1$ is hydrogen. In addition to their use as intermediates, the compounds lower blood pressure in test animals at 10–100 mg./kg. and thus, are also useful as anti-hypertensive agents.

The compounds of this invention are renal vasodilators and have been found to significantly increase renal blood flow in test animals. The compounds are particularly useful in the treatment of renal hypertension. The increase in renal arterial blood flow was measured in dogs as follows: A 9 mm electromagnetic flow probe is surgically implanted around the right renal artery of each test animal. The terminal conductor is brought out through the animal's skin near the scapula and secured. The terminal conductor is then coupled to a lead wire from a Carolina Medical Electronics two-channel electromagnetic flowmeter, and recordings are made on a Grass polygraph. Changes from control levels of flow after administration are calculated on a percent basis. Generally speaking, dosages of 30 mg./kg. of body weight have been found to increase the renal blood flow in dogs from 75 to 100 percent for up to 5 hours.

The compounds can be administered in dosages of from 250 to 750 mg. three times a day to hypertensive patients to control their blood pressure. In treating shock, larger initial dosages of from 10 to 30 mg./kg. of body weight can be employed.

While the compounds can be administered as the free base, it is generally preferred to employ the compounds as their pharmaceutically acceptable acid addition salts. Presently preferred compounds are those wherein $R_3$ is alanine or phenylalanine.

Generally speaking, the compounds of this invention are prepared by reacting 3',4'-dibenzyloxy-β-phenethylamine with a suitable N-carbobenzyloxy D, L or DL amino acid, hydrogenating the resulting amide in the presence of methanol and acid, and working up the resulting amide. The starting materials are known compounds and can be prepared by literature methods.

The following examples further illustrate the present invention.

EXAMPLE 1

Preparation of
N-3',4'-Dihydroxy-β-phenethyl-L-Alanine Amide Hydrochloride

A. A solution of 11.1 g. (0.03 mole) of 3,4-dibenzyloxy phenethylamine hydrochloride in 100 ml. of methanol was treated with 1.62 g. (0.03 mole) of dry sodium methoxide, the solvent was removed in vacuo and the residue dissolved in 100 ml. of acetonitrile, filtered and evaporated to dryness. This was treated with 20 ml. of acetonitrile and 40 ml. of dry tetrahydrofuran (THF) and warmed until solution was complete. To the warm mixture was added 4.46 g. (0.02 mole) of carbobenzyloxy-L-alanine. The solution was stirred until it was clear and then 4.95 g. (0.024 mole) of dicyclohexylcarbodiimide was added. An immediate exothermic reaction took place and a white precipitate started to form. The reaction was allowed to stand at room temperature for 3 hours and then filtered to remove 5.2 g. (96.6% of theory) of dicyclohexylurea. The filtrate was diluted with 10 ml. of THF, warmed to 40° and 2 ml. of acetic acid was added to the reaction. The solvent was removed in vacuo and the solid residue dissolved in chloroform, washed twice with 100 ml. of 2 N hydrochloric acid, washed with 100 ml. of saturated sodium chloride, washed twice with 100 ml. of saturated sodium bicarbonate, washed with 100 ml. of saturated sodium chloride and dried over anhydrous magnesium sulfate. Removal of the solvent gave 10.1 g. (94%) of a white solid. This was recrystallized from 125 ml. of ethanol to give 4.8 g. of [N'-carbobenzyloxy-L-alanyl]-N-[3',4'-dibenzyloxy-β-phenethyl]-amine, m.p. 151.5°–152.5°, $[\alpha]_D^{23}$ — 8.6° (1.6% $CHCl_3$).

Analysis Calcd. for $C_{33}H_{34}N_2O_5$: C, 73.58; H, 6.38; N, 5.20. Found: C, 73.26; H, 6.15; N, 5.23.

B. To 250 ml. of methanol containing 0.5 ml. (6.2 mmol) of concentrated hydrochloric acid was added 2.7 g. (5.0 mmol) of the above-prepared amine and 300 mg. of 10% palladium on carbon. The solution was hydrogenated at atmospheric pressure. Theoretical uptake was 380 ml., actual uptake 365 ml. (96%). The starting material was not soluble but as the reaction progressed the material dissolved. The catalyst was removed by filtration and the solvent was evaporated in vacuo. The solid was azeotroped dry with ethanol (2 × 50 ml.), triturated with 50 ml. of hot acetonitrile and filtered to yield 1.15 g. of N-3',4'-dihydroxy-β-phenethyl-L-alanine amide hydrochloride, m.p. 214°–218° (dec). $[\alpha]_D^{24}$ —36.4° (2.08%, $H_2O$).

Analysis Calcd. for $C_{11}H_{17}ClN_2O_3$: C, 50.67; H, 6.52; Cl, 13.63; N, 10.75; O, 18.43. Found: C, 50.69; H, 6.31; Cl, 13.77; N, 10.64; O, 18.63.

EXAMPLES 2–4

The following compounds were prepared according to the method of Example 1, by substituting the appropriate carbobenzyloxyamino acid for carbobenzyloxy-L-alanine.

N-3',4'-Dihydroxy-β-phenethyl-L-tyrosine amide, hemisulfate, m.p. 86°–91°.

N-3',4'-Dihydroxy-β-phenethyl-L-tyrosine amide, oxalate, m.p. 163°–167°.

N-3',4'-Dihydroxy-β-phenethylglycine amide oxalate, m.p. 173°–175°.

EXAMPLE 5

[N'-Carbobenzyloxy-L-alanyl]-N-[3',4'-dibenzyloxy-β-phenethyl]amine

A solution of 4.5 g. (0.02 mole) of carbobenzyloxy-L-alanine, and 3.1 g. (0.022 mole) of p-nitrophenol in 200 ml. of ethylacetate was cooled to 0°. To this stirred solution was added a solution of 8.4 g. (0.02 mole) of dicyclohexylcarbodiimide in 50 ml. of ethylacetate. The reaction solution was stirred and allowed to warm up to room temperature whereupon the solution became cloudy and dicyclohexylurea began to precipitate. The mixture was stirred for 2 hours, filtered and the filtrate concentrated in vacuo to yield the product as a crude oil. The oil was taken up in 50 ml. of dimethylformamide and treated with 7.4 g. (0.02 mole) of 3,4-dibenzyloxy-β-phenethylamine hydrochloride. To this stirred solution was added 7 ml. (0.05 mole) of triethylamine. The reaction mixture was stirred for 2 hours at room temperature and then was treated dropwise with water whereupon the reaction mixture first turned to a clear yellow solution and then yielded a light yellow precipitate. An equal volume of water was added, the reaction mixture was filtered and the product washed with water and air dried to yield 10.0 g. of crude product, m.p. 150°–4°. The crude product was recrystallized twice from absolute ethanol to yield 9.2 g. of product as colorless needles, m.p. 154°–5°, $[\alpha]_D^{23} = -9.8$ (1.6% $CHCl_3$).

Analysis Calcd. for $C_{33}H_{34}N_2O_5$: C, 73.58; H, 6.36; N, 5.20. Found: C, 73.77; H, 6.50; N, 5.20.

EXAMPLE 6

N-(L-Pyroglutamyl)-N-3',4'-dibenzyloxy-β-phenethylamine

A solution of L-pyroglutamic acid (12.9 g., 0.1 mole) and pentachlorophenol (26.6 g., 0.1 mole) in 100 ml. of $CH_2Cl_2$ and 100 ml. of dimethylformamide was treated with stirring with a solution of dicyclohexylcarbodiimide (20.6 g., 0.1 mole) in 100 ml. of $CH_2Cl_2$. The reaction mixture was stirred at room temperature overnight. The dicyclohexylurea was collected as in Example 5, and the filtrate concentrated in vacuo to yield the crude ester. The ester was crystallized from 400 ml. of absolute ethanol containing 10 drops of glacial acetic acid to yield 18.0 g. of platelets, m.p. 195°–8°. The platelets were dissolved in dimethylformamide (20 ml.) and 3',4'-dibenzyloxy-β-phenethylamine hydrochloride (18.5 g., 0.05 mole) was added thereto with stirring. The stirred solution was treated with triethylamine (14 ml., 0.1 mole). The reaction mixture was then stirred for two days and diluted with water to give a gel. The dimethylformamide-water solution was extracted with chloroform three times. The chloroform extracts were combined and extracted three times with 50 ml. aliquots of water and dried over $Na_2SO_4$. The dried chloroform extract was concentrated in vacuo to yield the product as an oil. The oil was taken up in a small amount of hot absolute ethanol and cooled to yield 15.5 g. of product as a white solid, m.p. 95°–105°. Recrystallization for 150 ml. of boiling absolute ethanol yielded 12.5 g. of product as a white microcrystalline solid, m.p. 108°–110° $[\alpha]_D^{23}$ —9.8 (1.6% $CHCl_3$).

Analysis Calcd. for $C_{27}H_{28}N_2O_4$: C, 72.95; H, 6.35; N, 6.30. Found: C, 72.88; H, 6.49; N, 6.33.

EXAMPLES 7–33

The following compounds were prepared according to the method of Example 5, in the case wherein $R_1$ is benzyl and the amino acid is protected by a carbobenzyloxy group, and according to the method of 1B. when $R_1$ is hydrogen and the amino acid group is unprotected. In the following table, $PhCH_2$ refers to benzyl and CBZ refers to carbobenzyloxy. The amino acid side chain ($R_3$) is named on the first occurrence thereof in the table. $R_2$ is hydrogen in Examples 7–33.

$$R_1O-\underset{R_1O-}{\diagup}\kern-1em\diagdown-CH_2\overset{R_2}{\underset{|}{C}}HNH-R_3$$

| Ex. | $R_1$ | $R_3$ | MP | Solvent | Empirical Formula and Microanalysis |
|-----|-------|-------|-----|---------|--------------------------------------|
| 7 | H | —C(=O)—CH(NH₂·HCl)—CH₂—Ph (phenylalanyl) | Glass | EtOH | $C_{17}H_{21}ClN_2O_3$ Calcd. C, 60.62; H, 6.28; N, 8.32 Found. C, 60.33; H, 6.38; N, 8.25 |
| 8 | $PhCH_2$ | —C(=O)—CH(NH—CBZ)—CH₂—Ph | 151–53° | EtOH | $C_{39}H_{38}N_2O_5$ Calcd. C, 76.20; H, 6.23; N, 4.56 Found. C, 76.50; H, 6.35; N, 4.59 |
| 9 | H | —C(=O)—C(CH₃)(CH₃)—NH₂·HCl (α-methylalanyl) | Glass | EtOH | $C_{12}H_{19}ClN_2O_3$ Calcd. C, 52.46; H, 6.97; N, 10.20 Found. C, 53.10; H, 7.26; N, 10.25 |
| 10 | $PhCH_2$ | —C(=O)—C(CH₃)(CH₃)—NH—CBZ | Glass | EtOH | $C_{34}H_{36}N_2O_5$ Calcd. C, 73.89; H, 6.57; N, 5.07 Found. C, 73.54; H, 6.73; N, 5.15 |
| 11 | $PhCH_2$ | —C(=O)—CH(NH—CBZ)—CH₂—C(=O)—OCH₂—Ph (aspartic acid) | 116–20° | EtOH | $C_{41}H_{40}N_2O_7$ Calcd. C, 73.19; H, 5.99; N, 4.16 Found. C, 73.02; H, 5.89; N, 4.77 |

—Continued

| Ex. | R₁ | R₃ | MP | Solvent | Empirical Formula and Microanalysis |
|---|---|---|---|---|---|
| 12 | $PhCH_2$ | $-\overset{O}{\underset{\|}{C}}-CH_2CH_2NH-CBZ$ (β-alanyl) | 144–6° | EtOH | $C_{35}H_{34}N_2O_5$<br>Calcd. C, 73.58; H, 6.36; N, 5.20<br>Found. C, 74.27; H, 6.47; N, 5.27 |
| 13 | H | $-\overset{O}{\underset{\|}{C}}-CH_2CH_2NH_2 \cdot HCl$ | 195–8° | EtOH | $C_{11}H_{17}ClN_2O_3$<br>Calcd. C, 50.67; H, 6.52; N, 10.75<br>Found. C, 50.55; H, 6.75; N, 10.61 |
| 14 | $PhCH_2$ | $-\overset{O}{\underset{\|}{C}}-(CH_2)_3NHCBZ$ (γ-aminobutyric acid) | 144–6° | EtOH | $C_{31}H_{36}N_2O_5$<br>Calcd. C, 73.89; H, 6.57; N, 5.07<br>Found. C, 74.01; H, 6.57; N, 4.89 |
| 15 | H | $-\overset{O}{\underset{\|}{C}}-\underset{H}{\overset{}{\underset{N}{\bigcirc}}}=O$ (pyroglutamic acid) | 187–189° | $H_2O$ | $C_{13}H_{16}N_2O_4$<br>Calcd. C, 59.08; H, 6.10; N, 10.60<br>Found. C, 58.80; H, 6.24; N, 10.40 |
| 16 | $PhCH_2$ | $-\overset{O}{\underset{\|}{C}}-CH_2CH_2CH_2Cl$ (γ-chlorobutyric acid) | 111–2° | Benzene-Pentene | $C_{26}H_{28}ClNO_3$<br>Calcd. C, 71.30; H, 6.45; N, 3.20<br>Found. C, 70.97; H, 6.46; N, 2.99 |
| 17 | H | $-\overset{O}{\underset{\|}{C}}-(CH_2)_3NH_2 \cdot HCl$<br>$\cdot 0.5H_2O$ | Glass | EtOH | $C_{12}H_{19}ClN_2O_3$<br>Calcd. C, 51.49; H, 7.03; N, 10.36<br>Found. C, 51.61; H, 7.04; N, 10.03 |
| 18 | $PhCH_2$ | $-\overset{O}{\underset{\|}{C}}-\underset{CBZ}{\overset{}{\underset{N}{\bigcirc}}}$ (L-proline) | 105–7° | MeOH | $C_{35}H_{36}N_2O_5$<br>Calcd. C, 74.44; H, 6.43; N, 4.96<br>Found. C, 74.58; H, 6.51; N, 5.00 |
| 19 | H | $-\overset{O}{\underset{\|}{C}}-\underset{\|}{\overset{CH_2COOH}{CHNH_2}} \cdot HCl$ (L-aspartic acid) | Glass | EtOH | $C_{12}H_{17}ClN_2O_5$<br>Calcd. C, 47.30; H, 5.62; N, 9.19<br>Found. C, 49.18; H, 5.89; N, 9.16 |
| 20 | $PhCH_2$ | $-\overset{O}{\underset{\|}{C}}-CH_2NHCH_3-CBZ$ (sarcosine) | 90–5° | MeOH:$H_2O$ | $C_{35}H_{34}N_2O_5$<br>Calcd. C, 73.58; H, 6.36; N, 5.20<br>Found. C, 73.41; H, 6.41; N, 5.13 |
| 21 | $PhCH_2$ | $-\overset{O}{\underset{\|}{C}}-(CH_2)_3-N\underset{}{\bigcirc}N-CH_3$ (γ-N-methylpiperazino-butyric acid) | 98–9° | Ether-Pentene | $C_{31}H_{39}N_3O_3$<br>Calcd. C, 74.22; H, 7.84; N, 8.38<br>Found. C, 73.92; H, 7.90; N, 8.14 |
| 22 | $PhCH_2$ | $-\overset{O}{\underset{\|}{C}}-\underset{CH_2-\bigcirc}{\overset{}{CHNHCBZ}}$ (phenylalanine) | 135–8° | EtOH | $C_{40}H_{40}N_2O_5S$<br>Calcd. C, 72.70; H, 6.10; N, 4.24<br>Found. C, 72.80; H, 6.08; N, 4.24 |
| 23 | H | $-\overset{O}{\underset{\|}{C}}-\underset{H \cdot HCl}{\overset{}{\underset{N}{\bigcirc}}}$ (L-proline) | Glass | EtOH | $C_{13}H_{19}ClN_2O_3$<br>$\cdot 0.5\ H_2O$<br>Calcd. C, 52.79; H, 6.82; N, 9.47<br>Found. C, 52.28; H, 7.06; N, 9.42 |
| 24 | $PhCH_2$ | $-\overset{O}{\underset{\|}{C}}-\underset{\|}{\overset{}{CHNH-CBZ}}$<br>$CH_2CH(CH_3)_2$ (l-leucine) | 140–2° | EtOH | $C_{16}H_{40}N_2O_5$<br>Calcd. C, 74.46; H, 6.94; N, 4.82<br>Found. C, 74.76; H, 6.99; N, 4.82 |
| 25 | H | $-\overset{O}{\underset{\|}{C}}-CH_2NHCH_3$<br>$\cdot HCl$ | 165–8° | EtOH | $C_{11}H_{17}ClN_2O_3$<br>Calcd. C, 50.67; H, 6.52; N, 10.75<br>Found. C, 50.95; H, 6.60; N, 10.69 |

−Continued

| Ex. | R₁ | R₃ | MP | Solvent | Empirical Formula and Microanalysis |
|---|---|---|---|---|---|
| 26 | PhCH₂ | $\underset{O}{\overset{\|}{C}}-\underset{CH_2CH_3}{\overset{\|}{C}H}-NHCBZ$ (α-aminobutyric acid) | 148–9° | EtOH | $C_{34}H_{36}N_2O_5$ <br> Calcd. C, 73.89; H, 6.57; N, 5.07 <br> Found. C, 74.31; H, 6.70; N, 5.17 |
| 27 | H | $\underset{O}{\overset{\|}{C}}-\underset{CH_2CH_3}{\overset{\|}{C}H}-NH_2\cdot HCl$ | 184–6° | EtOH | $C_{12}H_{18}N_2O_3\cdot HCl$ <br> Calcd. C, 52.45; H, 6.97; N, 10.20 <br> Found. C, 52.88; H, 7.21; N, 10.14 |
| 28 | PhCH₂ | $\underset{O}{\overset{\|}{C}}-CH_2-NH\underset{O}{\overset{\|}{C}}OC(CH_3)_3$ | 110–110.5° | EtOAC Skelly B | $C_{29}H_{31}N_2O_5$ <br> Calcd. C, 71.00; H, 6.99; N, 5.71 <br> Found. C, 71.31; H, 7.05; N, 5.65 |
| 29 | PhCH₂ | $\underset{O}{\overset{\|}{C}}-CH_2CH_2\overset{O}{\overset{\|}{C}}-OC_2H_5$ | 89–90° | Benzene Skelly B | $C_{28}H_{31}NO_5$ <br> Calcd. C, 72.86; H, 6.77; N, 3.04 <br> Found. C, 72.93; H, 6.85; N, 3.06 |
| 30 | PhCH₂ | $\underset{O}{\overset{\|}{C}}-CH_2-NHCBZ$ | 102–4° | EtOH | $C_{32}H_{32}N_2O_5$ <br> Calcd. C, 73.26; H, 6.15; N, 5.34 <br> Found. C, 73.28; H, 6.14; N, 5.31 |
| 31 | H | $\underset{O}{\overset{\|}{C}}-CH_2-NH_2\cdot HCl$ | 178–9° | CH₃OH– ether | $C_{10}H_{14}N_2O_3\cdot HCl$ <br> Calcd. C, 48.68; H, 6.13; N, 11.36 <br> Found. C, 47.00; H, 6.00; N, 11.07 |
| 32 | PhCH₂ | $\underset{O}{\overset{\|}{C}}-\underset{\underset{CH_3}{\|}}{\overset{\|}{C}H-C_2H_5}-NH-CBZ$ | 160–1° | EtOH | $C_{36}H_{40}N_2O_5$ <br> Calcd. C, 74.45; H, 6.94; N, 4.82 <br> Found. C, 74.78; H, 7.01; N, 4.76 |
| 33 | H | $\underset{O}{\overset{\|}{C}}-\underset{\underset{CH_3}{\|}}{\overset{\|}{C}H-CH_2H_5}-NH_2\cdot HCl$ | 85–90 glass | EtOH ether | $C_{14}H_{22}N_2O_3\cdot HCl$ <br> Calcd. C, 55.53; H, 7.66; N, 9.25 <br> Found. C, 55.45; H, 7.73; |

EXAMPLE 34

[N-Carbobenzyloxy-L-alanyl]-N-[3′,4′-dibenzyloxy-α-methyl-β-phenethyl]amine

A mixture of p-nitrophenol (7.0 g., 0.05 mole) and carbobenzyloxy-L-alanine (11.0 g., 0.05 mole) in 200 ml. of ethyl acetate was cooled to −20° in a dry ice-acetone bath, and then treated with a solution of dicyclohexylcarbodiimide (10.5 g., 0.05 mole) in 50 ml. of ethyl acetate. The stirred solution was allowed to warm to room temperature and stirred for 2 hours. The insoluble by-product of dicyclohexylurea was filtered off and the filtrate concentrated in vacuo to give the crude p-nitrophenyl ester. The crude ester was taken up in 50 ml. of dimethylformamide and treated with dibenzyloxy-α-methyldopamine hydrochloride (17.4 g., 0.05 mole). The stirred solution was treated with triethylamine (14 ml., 0.1 mole). After stirring at room temperature for 2 hours, the reaction mixture was diluted with 2 volumes of water whereupon a light yellow solid formed. The solid material was washed well with water, redissolved in dimethylformamide and precipitated again with water to yield the product as a white solid. The product was dried in vacuo to yield 23 g. of product, m.p. 125°–140°.

Analysis Calcd. for $C_{34}H_{36}N_2O_5$: C, 73.89; H, 6.57; N, 5.07. Found: C, 73.82; H, 6.64; N, 5.09.

EXAMPLES 35–41

The following compounds were prepared according to the method of Example 34, using the appropriate carbobenzyloxy-amino acid.

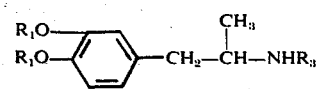

| Ex. | R₁ | R₃ | MP | Solvent | Empirical Formula and Microanalysis |
|---|---|---|---|---|---|
| 35 | PhCH₂ | $-\overset{O}{\overset{\|}{C}}-CH_2NH-CBZ$ | 110–12° | DMF–H₂O | $C_{33}H_{34}N_2O_5$ <br> Calcd. C, 73.58; H, 6.36; N, 5.20 <br> Found. C, 73.68; H, 6.43; N, 5.33 |
| 36 | PhCH₂ | $-\overset{O}{\overset{\|}{C}}-\underset{\underset{CH_3}{\|}}{CHNH}-CBZ$ | 120–30° | EtOH | $C_{34}H_{36}N_2O_5$ <br> Calcd. C, 73.89; H, 6.57; N, 5.07 <br> Found. C, 73.82; H, 6.64; N, 5.09 |

—Continued

| Ex. | R₁ | R₃ | MP | Solvent | Empirical Formula and Microanalysis |
|---|---|---|---|---|---|
| 37 | PhCH₂ | −C(=O)−CHNH−CBZ<br>　　　　\|<br>　　　　CH₂−C₆H₅ | 135–55° | EtOH | C₄₀H₄₀N₂O₅<br>Calcd. C, 76.41; H, 6.41; N, 4.46<br>Found. C, 76.70; H, 6.52; N, 4.54 |
| 38 | PhCH₂ | −C(=O)−CHNH−CBZ<br>　　　　\|<br>　　　　CH(CH₃)C₂H₅ | 152–69° | EtOH | C₃₇H₄₂N₂O₅<br>Calcd. C, 74.72; H, 7.12; N, 4.71<br>Found. C, 74.92; H, 7.16; N, 4.72 |
| 39 | H | −C(=O)−(CH₂)₃N⟨piperazine⟩N−CH₃<br>.2HCl.H₂O | Glass | | C₁₇H₂₇N₃O₃.2HCl.H₂O |
| 40 | PhCH₂ | −C(=O)−CH(CH₂)₄NHCBZ<br>　　　　\|<br>　　　　NHCBZ | 130–2° | EtOH | C₄₄H₄₇N₃O₇<br>Calcd. C, 72.41; H, 6.49; N, 5.76<br>Found. C, 72.12; H, 6.47; N, 5.78 |
| 41 | H | −C(=O)−CH(CH₂)₄NH₂.HCl<br>　　　　\|<br>　　　　NH₂.HCl | Glass | | C₁₄H₂₃N₃O₃.2HCl<br>Calcd. C, 47.46; H, 7.11; N, 11.86<br>Found. C, 44.84; H, 7.45; N, 11.24 |

The following compounds were prepared according to the method of Example 1A, from the corresponding 3',4'-dibenzyloxy-carbobenzyloxy-protected compounds:

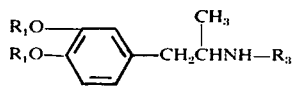

$$R_1O-\underset{R_1O-}{\underset{|}{\bigcirc}}-CH_2\overset{CH_3}{\underset{|}{C}}HNH-R_3$$

| Ex. | R₁ | R₃ | MP | Empirical Formula and Microanalysis |
|---|---|---|---|---|
| 42 | H | −C(=O)−CH₂NH₂.HCl.½H₂O | Glass | C₁₁H₁₆N₂O₃.HCl.½H₂O<br>Calcd. C, 48.80; H, 7.07; N, 10.35<br>Found. C, 49.20; H, 6.67; N, 10.35 |
| 43 | H | −C(=O)−CHNH₂.HCl<br>　　　　\|<br>　　　　CH₃ | Glass | C₁₂H₁₈N₂O₃.HCl<br>Calcd. C, 52.46; H, 6.97; N, 10.20<br>Found. C, 52.53; H, 7.26; N, 10.18 |
| 44 | H | −C(=O)−CHNH₂.HCl<br>　　　　\|<br>　　　　CH₂−C₆H₅ | Glass | C₁₈H₂₂N₂O₃.HCl<br>Calcd. C, 61.62; H, 6.61; N, 7.98<br>Found. C, 61.80; H, 6.92; N, 8.19 |
| 45 | H | −C(=O)−CHNH₂.HCl.½H₂O<br>　　　　\|<br>　　　　CH(CH₃)C₂H₅ | Glass | C₁₅H₂₄N₂O₃.HCl.½H₂O<br>Calcd. C, 55.29; H, 8.04; N, 8.60<br>Found. C, 54.47; H, 7.97; N, 8.60 |

The compounds useful in the practice of the present invention are generally formulated into pharmaceutical compositions comprising, as an active ingredient, at least one of the active agents in association with a pharmaceutical carrier or diluent. The compounds useful in the practice of the invention exhibit both oral and parenteral activity and can be formulated in dosage forms for oral or parenteral administration.

Solid dosage forms for oral administration include capsules, tablets, pills, powders and granules. In such solid dosage forms, the active compound is admixed with at least one inert diluent such as sucrose, lactose or starch. Such dosage forms can also comprise, as is normal practice, additional substances other than inert diluents, e.g., lubricating agents such as magnesium stearate, sweetening and flavoring agents, and the like. In the case of capsules, for example, the active agent may be the sole ingredient.

Liquid dosage forms for oral administration include, pharmaceutically acceptable emulsions, solutions, suspensions, syrups and elixirs containing inert diluents commonly used in the art, such as water. Besides inert diluents, such compositions can also include adjuvants, such as wetting agents, emulsifying and suspending agents and sweetening, flavoring and perfuming agents.

Preparations according to this invention for parenteral administration include sterile aqueous or nonaqueous solutions, suspensions or emulsions. Examples of non-aqueous solvents or vehicles are propylene glycol, polyethylene glycol, vegetable oils, such as olive oil and injectable organic esters such as ethyl oleate. Such dosage forms may also contain adjuvants such as preserving, wetting, emulsifying and dispersing agents. They may be sterilized by, for example, filtration through a bacteria-retaining filter, by incorporating sterilizing agents into the compositions, by irradiating the compositions, or by heating the compositions. They can also be manufactured in the form of sterile solid compositions which can be dissolved in sterile water or some other sterile injectable medium immediately before use.

The dosage of active ingredient in the compositions of this invention may be varied; however, it is necessary that the amount of the active ingredient shall be such that a suitable dosage form is obtained. The selected dosage depends upon the desired therapeutic effect, on the route of administration and on the duration of the treatment.

We claim:

1. A compound of the formula

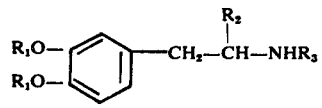

wherein each $R_1$ is hydrogen or benzyl; $R_2$ is hydrogen or loweralkyl and $R_3$ is derived from an amino acid selected from the group consisting of β-alanine, α-methylalanine, phenylalanine, 3,4-dihydroxyphenylalanine, 4-chlorophenylalanine, glycine, tyrosine, valine, leucine, iso-leucine, serine, threonine, aspartic acid, glutamine, arginine, lysine, γ-amino-butyric acid, alanine, sarcosine or $R_3$ is one of the above amino acids protected by either carbobenzyloxy or t-butyloxycarbonyl; and the pharmaceutically acceptable acid addition salts thereof.

2. A compound in accordance with claim 1 wherein $R_1$ is hydrogen, $R_2$ is loweralkyl and $R_3$ is an amino acid.

3. A compound in accordance with claim 2 wherein $R_2$ is methyl.

4. A compound in accordance with claim 3: N-3',4'-dihydroxy-α-methyl-β-phenethyl-L-alanine amide.

5. A compound in accordance with claim 3: N-3',4'-dihydroxy-α-methyl-β-phenethyl-L-phenylalanine amide.

6. A compound in accordance with claim 3: N-3',4'-dihydroxy-α-methyl-β-phenethyl-L-isoleucyl amide.

7. A compound in accordance with claim 1: [N'-carbobenzyloxy-L-alanyl]-N-(3',4'-dibenzyloxy-β-phenethyl)amine.

8. A compound in accordance with claim 1: [N'-carbobenzyloxy-L-alanyl]-N-(3',4'-dibenzyloxy-α-methyl-β-phenethyl)amine.

9. A compound in accordance with claim 1: [N'-carbobenzyloxy-L-phenylalanyl]-N-(3',4'-dibenzyloxy-β-phenethyl)amine.

10. A compound in accordance with claim 1: [N'-carbobenzyloxy-L-phenylalanyl]-N-(3',4'-dibenzyloxy-α-methyl-β-phenethyl)amine.

* * * * *